E. W. CRAWFORD & S. D. LINDSAY.
Lawn-Mowers.
No. 153,755.  Patented Aug. 4, 1874.
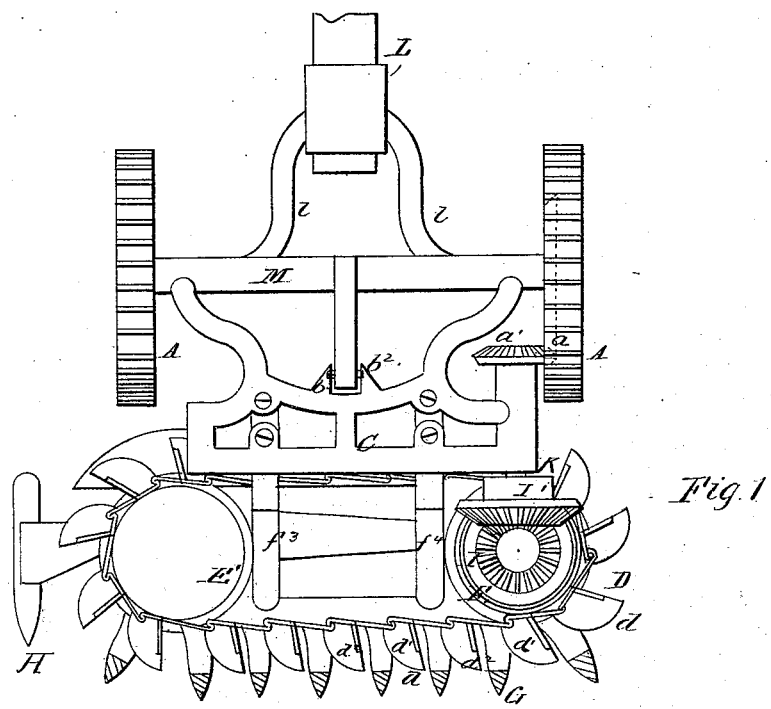
Fig. 1
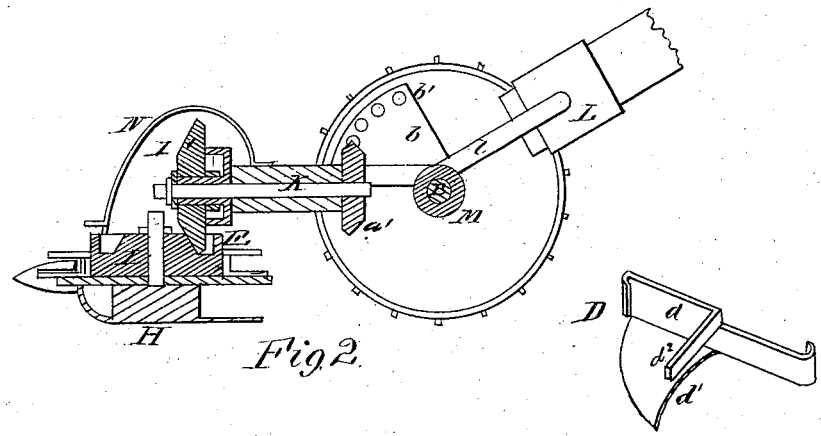
Fig. 2
Fig. 3
WITNESSES
Anthony A. Connolly
J. B. Connolly
Eli W. Crawford
Samuel D. Lindsay
INVENTOR
By Connolly Bro
Attorneys

UNITED STATES PATENT OFFICE.

ELI W. CRAWFORD AND SAMUEL D. LINDSAY, OF JACKSONVILLE, ILLINOIS.

IMPROVEMENT IN LAWN-MOWERS.

Specification forming part of Letters Patent No. 153,755, dated August 4, 1874; application filed March 13, 1874.

*To all whom it may concern:*

Be it known that we, ELI W. CRAWFORD and SAMUEL D. LINDSAY, of Jacksonville, in the county of Morgan and State of Illinois, have invented a certain new and useful Lawn-Mower; and we do hereby declare the following to be a full, clear, and exact description of the invention, such as will enable others skilled in the art to which it pertains to make and use it, reference being had to the accompanying drawings, which form part of this specification, in which—

Figure 1 is a plan view; Fig. 2, a vertical longitudinal section of our invention; and Fig. 3 is a detached view of one of the combined cutter and link sections, with its rake or conveying-tooth.

This invention has relation to lawn-mowers; and consists in the novel construction and arrangement of component parts, having particular reference, first, to the novel construction, from a single plate or piece of metal, of a combined link, cutter, and rake, for an endless sickle belt or chain; and, secondly, the means for adjusting the handle to any required height.

Referring to the accompanying drawings, A A designate the wheels, B the axle, and C the main frame, of a lawn-mower, in which are embodied our improvements, of which the most essential is the sickle belt or chain D, composed of a series of links, $d$, bent at the ends and hinged or jointed together as shown, and provided each with a cutter, $d^1$, of the form shown, or other suitable form, sharpened on one edge, and with an outwardly-projecting arm or rake-finger, $d^2$. E E' designate the pulleys around which the sickle-chain travels. Said pulleys turn upon the base-plate, near each end of which they are arranged. G designates the guard-teeth, similar in form to those of an ordinary reaper. H are shoes or runners, supporting the base-plate at a proper height above the ground. $f^3 f^4$ are curved standards, secured to or cast upon the frame C, and supporting the base-plate upon said frame. I designates a beveled gear-wheel formed upon or secured to the pulley E, and I' is a beveled gear-wheel engaging with I, and journaled upon a horizontal shaft, K, which receives motion from the main wheel A through the spur-gearing $a$ and the pinion $a'$. L represents the handle-socket, connected by arms $l$ to a tube or collar, M, upon the axle B. This collar turns easily upon the axle, and is cast or otherwise provided with a segmental plate, $b$, having holes $b^1$ near its edge. The plate $b$ fits a notch, $b^2$, in the rear portion of the frame A, and may be adjusted to raise and lower the handle, a pin or pins, $b^3$, being inserted in the proper hole or holes to retain the handle in the required position. N designates a guard or fender, made of sheet-metal, bent to the proper form, and so arranged upon the implement as to protect the pulleys and gearing from the falling grass.

Having described our invention, we claim as new, and desire to secure by Letters Patent—

1. A link, sickle-blade, and rake-finger, combined and formed from a single piece of metal, substantially as shown and described.

2. The combination, with the handle-socket, of the collar M, notched frame A, and perforated adjusting-plate $b$, substantially as set forth.

In testimony that we claim the foregoing we have hereunto set our hands this 2d day of March, 1874.

ELI W. CRAWFORD.
    SAMUEL D. LINDSAY.

Witnesses:
 JOSEPH H. WELLS,
 CHARLES L. SMITH.